United States Patent
Ukeda et al.

(10) Patent No.: US 7,415,729 B2
(45) Date of Patent: Aug. 19, 2008

(54) STORAGE DEVICE

(75) Inventors: Masaharu Ukeda, Yokohama (JP);
Motoyasu Tsunoda, Sagamihara (JP);
Nagamasa Mizushima, Fujisawa (JP);
Kunihiro Katayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 757 days.

(21) Appl. No.: 10/463,768

(22) Filed: Jun. 18, 2003

(65) Prior Publication Data
US 2004/0068631 A1   Apr. 8, 2004

(30) Foreign Application Priority Data
Jun. 19, 2002   (JP)   ............... 2002-177883

(51) Int. Cl.
*G06F 7/04* (2006.01)
(52) U.S. Cl. ...................................... 726/26
(58) Field of Classification Search .................. None
See application file for complete search history.

(56) References Cited
U.S. PATENT DOCUMENTS
7,062,652 B2 * 6/2006 Hirota et al. ............... 713/172
2002/0157002 A1 * 10/2002 Messerges et al. ........... 713/155
2003/0023867 A1 * 1/2003 Thibadeau ................ 713/200

FOREIGN PATENT DOCUMENTS
| JP | 2001-14441 | 1/2001 |
| JP | 2002-163396 | 6/2002 |
| JP | 2002-163577 | 6/2002 |

* cited by examiner

*Primary Examiner*—Kambiz Zand
*Assistant Examiner*—Aubrey H Wyszynski
(74) *Attorney, Agent, or Firm*—Mattingly, Stanger, Malur & Brundidge, P.C.

(57) ABSTRACT

A storage device allows expanding user utilizable applications by storing information permitted to be read according to a certificate and information permitted to be read according to information determined by a user. An information distributor receives a certificate from the storage device and after verifying the certificate, transmits data of a license and access control conditions to the storage device. After receiving data of a certificate from an information browser, verifying the certificate and imposing a limit on access based upon one of access control conditions, the storage device transmits data of the license and the other to the information browser. The information browser permits utilization of the license under the limitation defined by the access control condition. The certificate includes either or both of a certificate approved by a certificate authority and a PIN (personal identifying number) determined by the user.

19 Claims, 12 Drawing Sheets

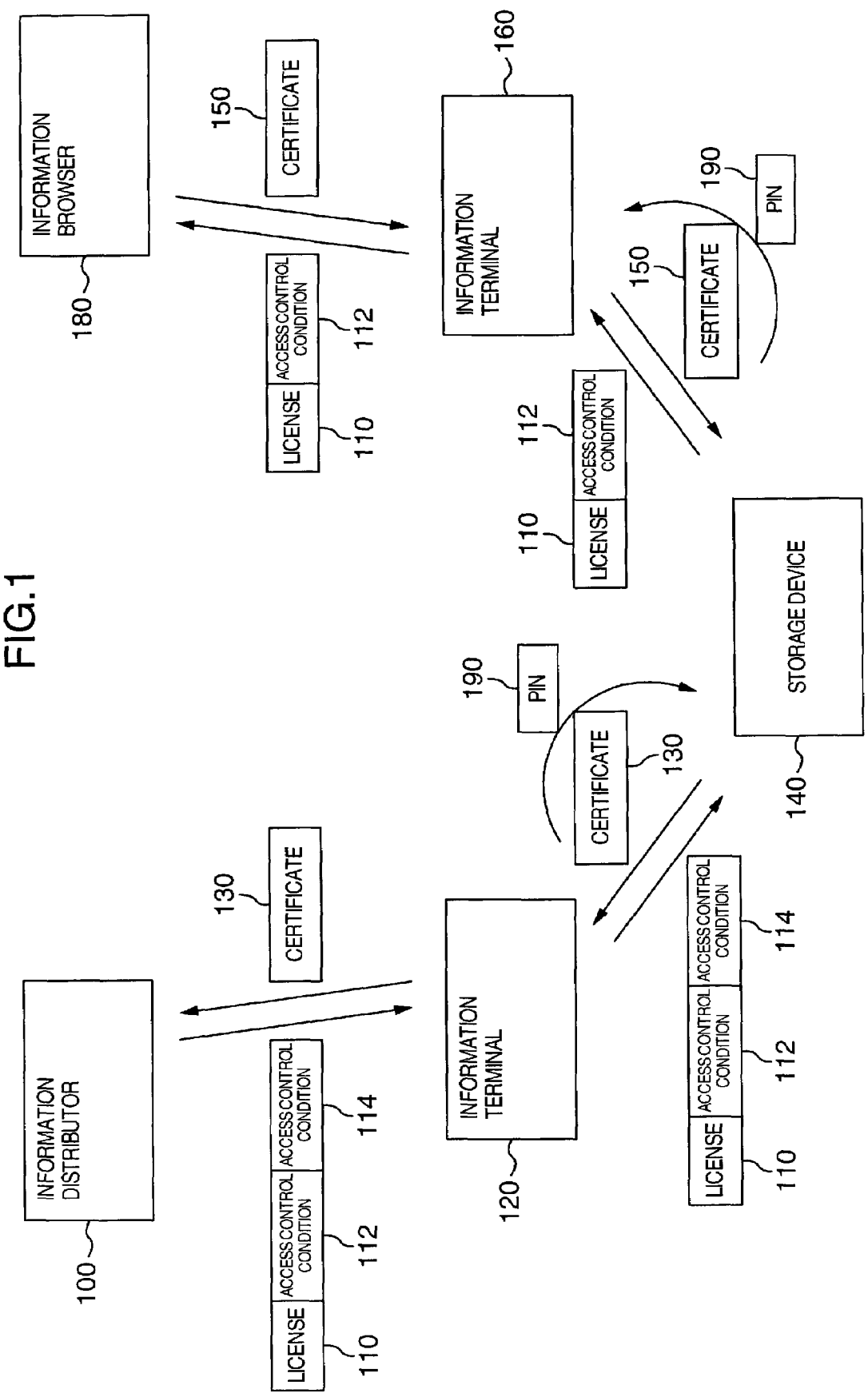

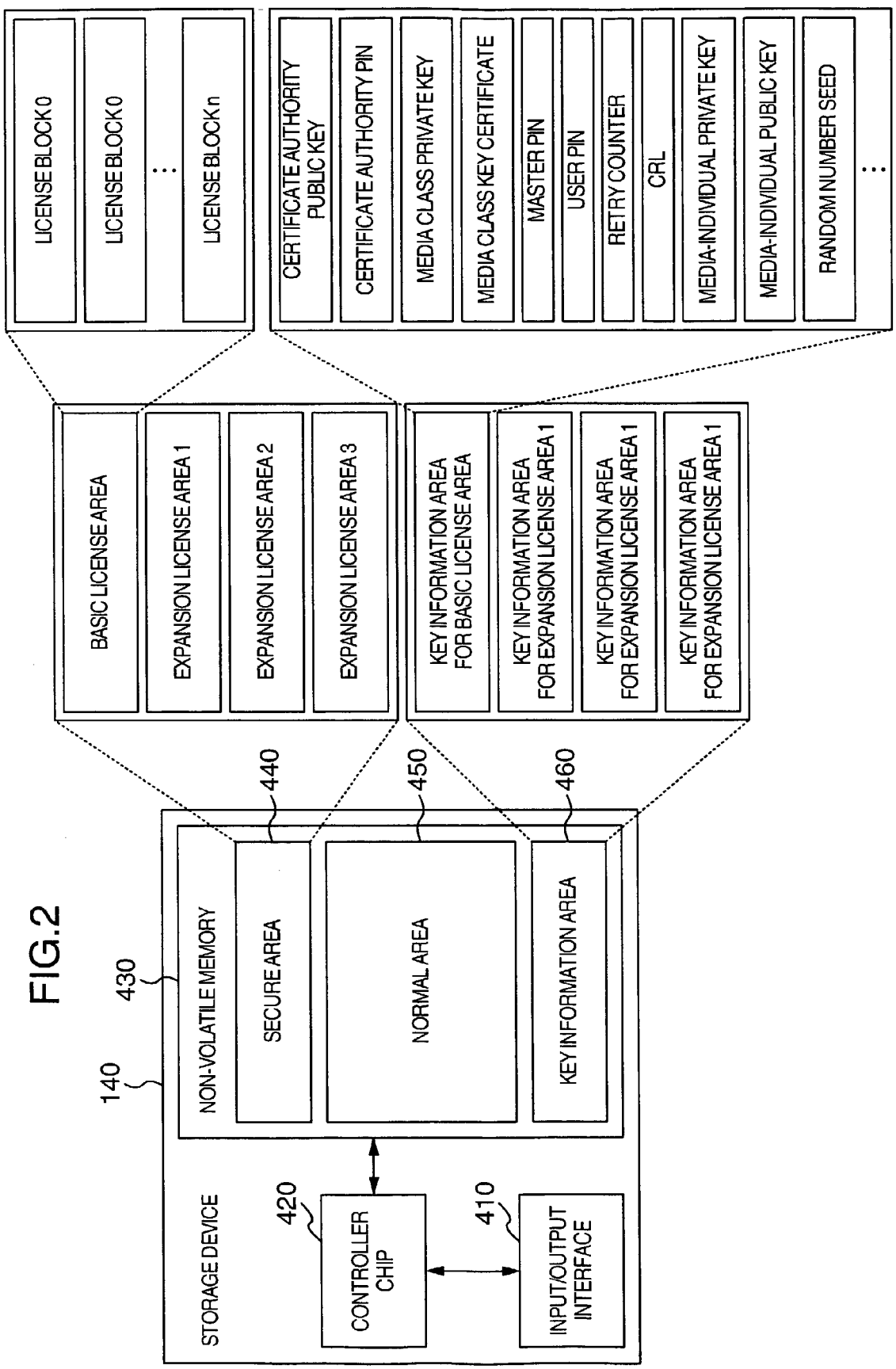

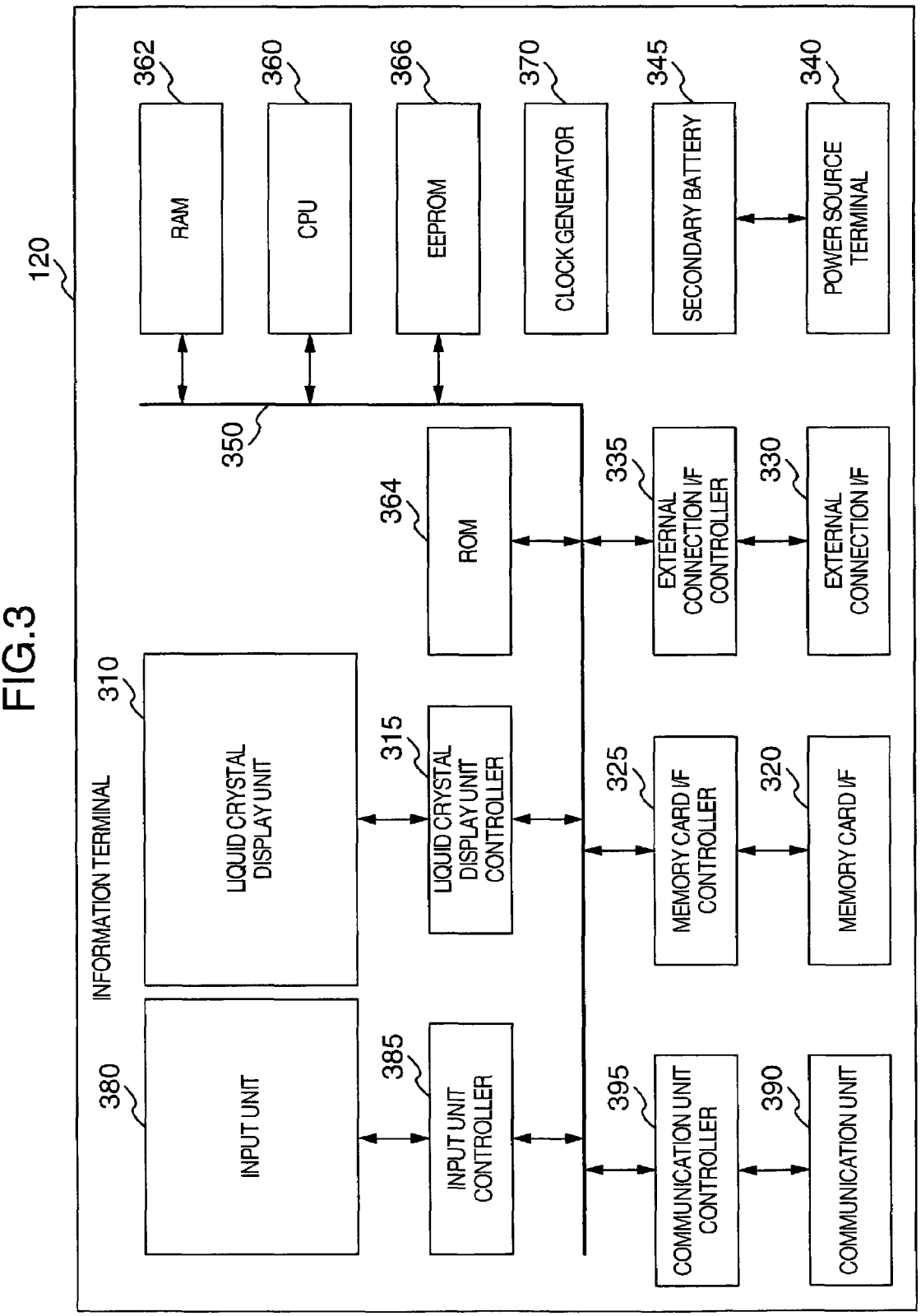

FIG.4

| | INS | Parameter 1 | Parameter 2 | Description |
|---|---|---|---|---|
| | 00h | n0h | NOT USED | NOT USED | SELECT AREA |
| USER AUTHENTICATION APPLICATION | 00h | n1h | PIN | NOT USED | SELECT AREA AND START LICENSE OPERATION PROTOCOL |
| | 00h | n2h | PIN | NEW PIN | WRITE NEW PIN |
| | 00h | n3h | PIN | MAXIMUM VALUE OF NEW RETRY COUNTER | WRITE NEW RETRY COUNTER MAXIMUM VALUE |
| | 00h | n4h | NOT USED | NEW PIN | INITIALIZE LICENSE AREA AND WRITE NEW PIN |
| | 00h | n5h | MASTER PIN | NOT USED | RESET RETRY COUNTER |
| RANDOM NUMBER GENERATION APPLICATION | 10h | n1h | PIN | RANDOM NUMBER SEED | GENERATE RANDOM NUMBER BY USING RANDOM NUMBER SEED |
| | 80h | n1h | CA PIN | STORAGE AREA NUMBER \|\| BLOCK NUMBER \|\| NEW CA PUBLIC KEY BLOCK | WRITE NEW CA PUBLIC KEY |
| CERTIFICATE AUTHORITY APPLICATION | 80h | n2h | CA PIN | STORAGE AREA NUMBER \|\| BLOCK NUMBER \|\| NEW CERTIFICATE BLOCK | WRITE NEW CERTIFICATE |
| | 80h | n3h | CA PIN | NEW KEY DATA | WRITE NEW KEY DATA |
| | 80h | n4h | CA PIN | NEW AREA RELATED INFORMATION | WRITE NEW AREA RELATED INFORMATION |
| | 80h | n5h | CA PIN | BLOCK NUMBER \|\| NEW CRL | WRITE NEW CRL |

STORAGE DEVICE

BACKGROUND OF THE INVENTION

The present invention relates to a storage device carrying the security function and a host apparatus to which the storage device is connectable and more particularly, to a memory card having a flash memory chip as a storage medium and to a cellular phone and a PDA (personal digital assistant) to which the memory card is connectable.

Nowadays, many providers are marketing small-sized memory cards of various standards. In general, the small-sized memory card has a memory capacity of several of mega to several of giga and it is connected to or inserted into a portable terminal, camera, AV (audio and visual) apparatus or information terminal so as to be used for storage and distribution of data and reception/transfer of data between apparatus.

Internally, the small-sized memory card has an interface connectable with external apparatus in a wireless/wired fashion, a non-volatile rewritable memory and a single or a plurality of controllers for controlling the former two and is fed with an external power supply, so that it can afford to perform operations such as read, write and erase of data.

As one of small-sized memory cards of this type, a secure MMC (multiMediaCard) is available. It should be understood that "Multimedia card" is a registered trademark by Infineon Corp. The secure MMC has a function to verify a certificate of the other party of communication in order to read private data out of a memory, different from an ordinary memory and dedicated to storage of private data, and transmit the read-out private data to only a legal or authorized communication partner.

SUMMARY OF THE INVENTION

The memory card has the function of authenticating the other party of communication by means of the certificate and therefore can afford to make it difficult to read private data from a card obtained illegally. But in case a portable information terminal such as a PDA or cellular phone is used, there is a high possibility that the host portable information terminal storing the certificate will concurrently be robbed or lost. In such an event, the private data inside the memory card will probably be read out illegally or without authorization.

Further, the memory card needs to be incorporated with information necessary for verification of the certificate by a maker of the memory card during production thereof and an operation such as rewrite of the private data cannot be permitted after production of the memory card.

Furthermore, the private data storage area of the memory card is utilized only for the purpose of protecting copyright in specified service and therefore an individual person cannot utilize the memory card for the benefit of storing private information of its own.

In addition, the memory card does not function to authenticate an individual and when a plurality of persons want to use a single card, data in the card cannot be kept to be secret.

An object of the present invention is to provide a storage device which can expand applications utilizable by users, for example, by storing both of information permitted to be read according to a certificate and information permitted to be read according to information determined by a user or the like.

According to one aspect of the invention, after an information distributor authenticates a storage device by using a first certificate, data including at least multimedia information is transferred from the information distributor to the storage device, the memory device stores the data and transfers the data stored in the storage device to an information browser after authenticating the information browser by using a second certificate, and further, when receiving an input of identification information determined by a user or the like from the information browser, the storage device compares the inputted identification information with identification information stored in advance in the storage device and in accordance with a result of the comparison, transfers arbitrary information different from the multimedia information and readable according to the second certificate to the information browser.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the concept of the invention.

FIG. 2 is a block diagram showing the construction of a storage device according to an embodiment of the invention.

FIG. 3 is a block diagram showing the construction of an information terminal according to an embodiment of the invention.

FIG. 4 is a table showing functions owned by a VERIFY_PIN command according to an embodiment of the invention.

DETAILED DESCRIPTION OF THE EMBODIMENTS

Figure 5:
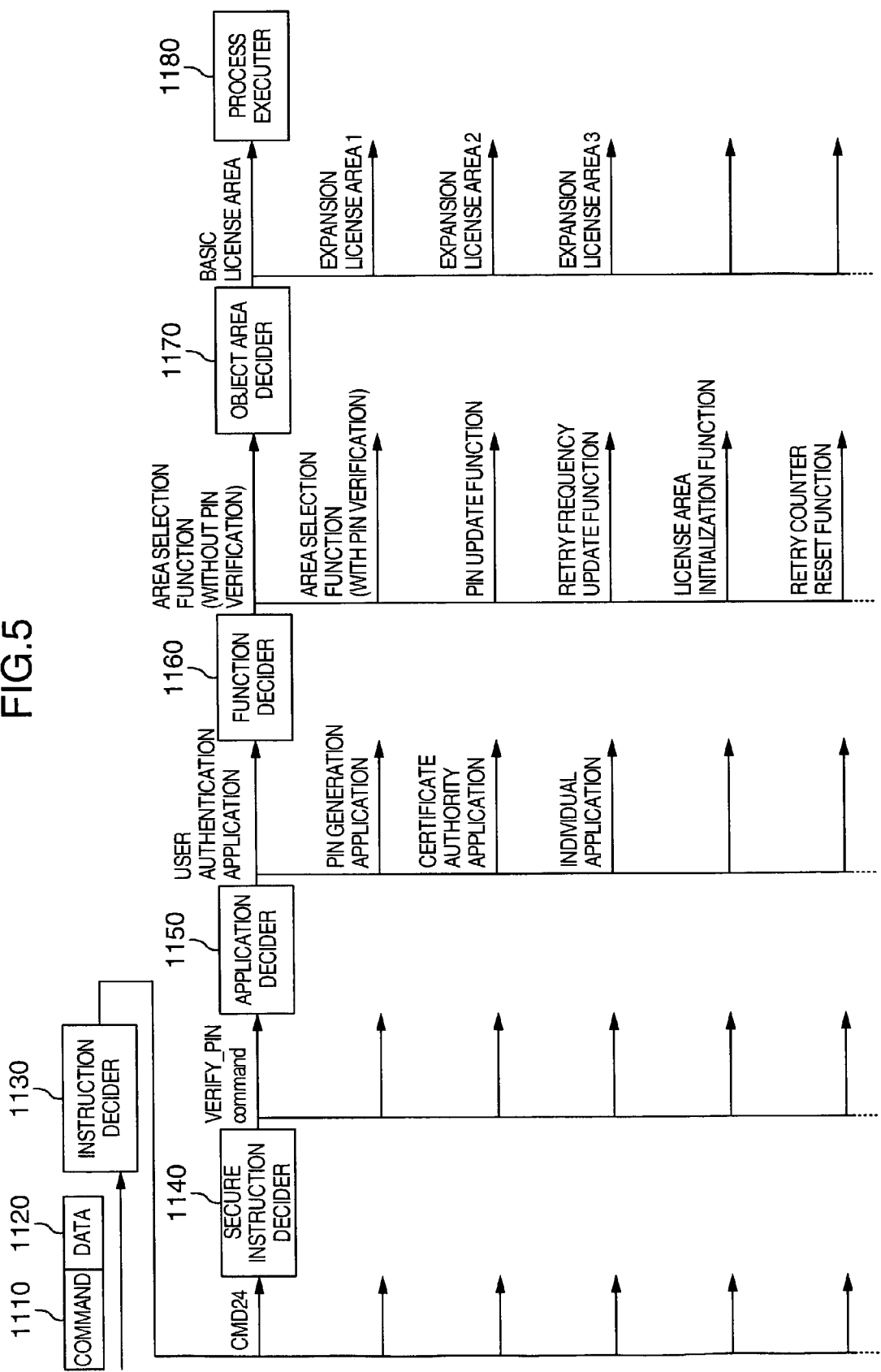
FIG. 5 is a flowchart showing a command decision process in the storage device according to an embodiment of the invention.

Referring first to FIG. 1, the concept of the present invention is diagrammatically illustrated.

As shown, there are provided an information distributor 100 for distributing multimedia information (for example, text data and music data, image data and applications/programs executable by a central processing unit), a storage device 140 capable of storing the multimedia information from the information distributor 100, an information terminal 120 capable of communicating with the information distributor 100 and connectable to the storage device 140 so as to receive the multimedia information from the information distributor 100 and store the multimedia information in the storage device 140, an information terminal 160 connectable to the storage device 140 to read the multimedia information from the memory device 140, and an information browser 180 capable of communicating with the information terminal 160 to browse (reproduce) the multimedia information.

Advantageously, in an embodiment of the invention, the storage device 140 can store, in addition to the multimedia information, arbitrary information utilizable by a user of the storage device 140 (for example, text data prepared by the user or a person employing the user, music data, image data and the like). The arbitrary information is readable according to a PIN (personal identifying number) set in the storage device 140 by the user or the person employing the user.

In an embodiment of the invention, both of the multimedia information permitted to be read according to a certificate and its license and the arbitrary information permitted to be read according to a PIN determined by the user or the like can be stored and consequently, utilizable applications of the storage device 140 by the user and the like can be expanded to advantage. Further, by sharing a part of protocol for permitting access by the certificate and a part of protocol for permitting access by the PIN determined by the user or the like, the capacity of an application program for executing these protocols can advantageously be reduced.

Available as the storage device 140 is a memory card. Available as the information terminals 120 and 160 are PC's, cellular phones, PDA's and kiosk terminals. Available as the information distributor 100 or the information browser 180 is a server, software on the information terminal, an access point or another information terminal. The information distributor 100 can communicate with the information terminal 120 through a network. The information terminal 120 is installed with license management software and it accesses the information distributor 100 and storage device 140 to transmit/receive a license and control execution of contents complying with a state of the license. The license referred to herein is what makes multimedia information limited in use (for example, encrypted multimedia information) utilizable and is exemplified by a key for decryption.

When downloading the multimedia information from the information distributor 100 and storing it in the storing device 140, the information terminal 120 first makes a request to the storage device 140 for a certificate, receives the certificate from the storage device 140 and transmits the certificate to the information distributor 100. The certificate is information that certifies the right of the storage device 140 and can be verified by the information distributor 100. Used as the certificate is a certificate of a public key issued by a certificate authority, information the storage device 140 and information distributor 100 share or information prepared from the shared information. Available as the information held in common by the storage device 140 and information distributor 100 or the information prepared from the shared information is a password number, personal identifying number, IP address, common key or the like.

The information distributor 100, storage device 140 and information browser 180 respectively prepare different public keys, that is, individually different public keys and private keys corresponding thereto and they register only the public keys at the certificate authority so as to be granted individually different certificates and a common public key. The certificate authority referred to herein is an organ specifically offering to users, apparatus or other certificate authorities a means that correlates an object and its individuality or classification with specific identification information, holds the information without altering its definiteness by itself and renders the specific identification information confirmable by third parties. In using this system, however, it is preferable that the authenticated private key of each apparatus be kept in safe custody in each apparatus. The certificate authority may be divided into an organ for proceeding with registration and retrieval of certificates and an organ for proceeding with issue of certificates and issue of certificate revocation lists.

The information distributor 100 verifies a certificate 130 and when the certificate is legal or authorized, it sends a license 110 and access control conditions 112 and 114 to the storage device 140 through the information terminal 120. The license 110 and access control conditions 112 and 114 used herein may be ones encrypted or coded using the information based on the certificate 130. The license 110 is information for certifying the right to utilize granted to an individual or a medium. Available as the license 110 is a credit card number, driver license number, license to utilize contents such as music and image, access key to a computer, password number, ticket, biometrics identification number, certificate number or the like. The access control condition 112 defines conditions for the information browser 180 to use the license and corresponds to a term of validity, age limit, playable size by permission of playback once, tolerance error or limitation on edition/copy of data. The access control condition 114 defines conditions the storage device 140 imposes on read of data and corresponds to a utilization permissible frequency, limitation on frequency of copy/move, limitation of reading function, limitation on the kind of certificating license utilized when reading, limitation on each user, limitation on a term of validity of license or limitation on each authentication system. A license preparer or the certificate authority may set the access control conditions 112 and 114. The license 110 may be shipped/issued while being stored in advance in the storage device 140. The license may be used for the purpose of operating data received externally without being read to outside. As a result of the operation, the value of the license may be rewritten. As a case that the license is issued while being stored in advance in the storage device 140, an instance is available in which a service provider ships a license individually specified to a user while storing it in the storage device 140. Available as the utilization for the purpose of operating data received externally is an instance in which only a license owner is permitted to decrypt or encrypt data by utilizing license data or an instance in which data utilized for mutual authentication, for example, is prepared. Available as the case of overwriting the result of operation on the license information now in use is an instance in which log data of a process utilizing the license is embedded in the license per se, an instance in which the license is rendered usable as a result of one or several operations or an instance in which the license is changed with a change in the authentication information such as a common key, the PIN and the certificate.

When the access control condition 114 includes an identifier specified to a certificate or representing the classification or kind of the certificate, the storage device 140 may impose an access limit in accordance with the identifier specific to the certificate used for authentication or representing the classification of the certificate. The storage device 140 holds the identifier of the certificate having succeeded in the verification and when data reading is carried out in a session based on the certificate, the memory device verifies an identifier of the data to be read using the held identifier and decides whether the data is permitted for reading. Available as making a decision as to whether read is permissible or not is an instance in which read is permitted only in the case of a particular certificate, an instance in which read is not permitted in the case of a particular certificate, an instance in which read is permitted only in the case of a specified kind or an instance in which read is not permitted only in the case of a particular kind. The above instances may be included in arbitrary combination in the access control condition 114. Used as the identifier having the above features is, for example, a serial number of certificate described on a certificate of the public key issued by the certificate authority. The certificate authority can make correlation to the classification and can make a decision individual by individual by regulating serial numbers to be granted in accordance with objects to which certificates are issued. The case where the above contrivance is effective may be exemplified to include an instance in which read is permitted with an ordinary PC but is not permitted with particular apparatus such as a game machine, an instance in which the information browser 180 holds a certificate complying with a contracted channel in order that only the channel contracted in information distribution service can be browsed or an instance in which serial numbers of certificates of information browsers 180 sold locally area by area are set by regulating them in accordance with individual areas, so that data of contents scheduled to be sold in a specified area may be limited so as not to be utilized in another area. For the certificate, ID's differing for individual users may be utilized and in this case, permissibility/impermissibility of read may be set user by user. By setting the identifier specific to the certificate in the license in this manner, an access limit can be imposed in accordance with security requirements individual by individual while holding data of different security requirements in the same memory area. Generally, these identifiers are determined during storage of license but may be set individually after license storage by objects having the right to license operation.

When causing the information browser 180 to read data stored in the storage device 140, the information terminal 160 requests a certificate 150 of the information browser 180. Receiving the certificate 150, the information terminal 160 sends it to the storage device 140. The storage device 140 verifies the certificate 150 and when the certificate is legal, it sends a license 110 and a access control condition 112 to the information browser 180 through the information terminal 160.

The license 110 and access control condition 112 referred to herein may be encrypted or coded in accordance with information based on the certificate 150. Further, in the license 110 and access control condition 112, access control may be set in accordance with conditions based on the access control condition 112. Furthermore, the storage device 140 may impose an access limit by utilizing the access control condition 112. The access limit the storage device 140 imposes by utilizing the access control condition 112 corresponds to an access limit complying with a term of validity or an access limit according to the encryption/decryption size.

When the license is read from the storage device 140 to the information browser 180, the access control condition 114 need not always be read. But when the license is read out of the information storage terminal 140 or moved therefrom to another information storage terminal, information of the access control condition 114 may additionally be transmitted. Structurally, each of the information distributor 100, information terminal 120, information terminal 160 and information browser 180 may be of plural. For example, communication between information distributor 100 and storage device 140 may be performed through a plurality of information terminals 120. Further, the information terminal 120 may be connected to a plurality of storage devices 140 or a plurality of information distributors 100. For the benefit of the information distributor 100, information terminal 120, information terminal 160 and information browser 180, a single apparatus may have a plurality of functions. For example, an instance may be available in which a license transmitted from a server, which has a structure implementing information terminals 120 and 160 identically and an information distributor, is stored in the storage device 140 and the license is browsed by means of software provided in a portable terminal 120 and having the function of the information browser 180. Further, an information distributor 100 participating in distribution of information may have the function of the information browser 180 and may read information from the storage device 140 to which the information is offered.

Turning to FIG. 2, the storage device according to an embodiment of the invention is constructed as shown therein.

The storage device 140 comprises an input/output interface 410 for connection to the information terminal 120 or 160, a rewritable non-volatile memory 430 and a controller chip 420 for controlling the above components. The input/output interface 410 is either of contact type or non-contact type. Available as a contact type interface is a compact flash (R) interface or USB (universal serial bus). Available as a non-contact type interface is a radio communication interface, BlueTooth interface or infrared interface. The non-volatile memory 430 has a secure area 440 for which data read needs to be authenticated, a normal area 450 for which authentication is not needed during read and write and a key information area 460 utilized for authentication operation and encryption/decryption operation. These memory areas may be formed on a single non-volatile memory 430 or may be formed on a plurality of non-volatile memories 430. Usable as the non-volatile memory 430 is a HDD (hard disk drive), flash memory, NROM (nitride ROM) or EEPROM (electronic erasable programmable ROM). The non-volatile memory may be constructed of a single memory or may be implemented using a plurality of memories in combination. Preferably, the controller chip has a CPU (central processor unit), a RAM (random access memory), a ROM (read only memory) and an EEPROM.

The secure region 440 is divided into a basic license area and three expansion license areas. Each license area can store 128 licenses. The basic license area is an area for which authentication according to the certificate 150 is necessary when data is read out. The expansion area is an area for which authentication according to the PIN is necessary when data is read out. The key information area 460 has a key information area for basic license area adapted for accessing the basis license area and three key information areas for expansion license areas adapted for accessing the three expansion license areas, respectively. Each key information area for license area can store certificate authority public keys, certificate authority PIN's, media class private keys, media class key certificates, master PIN's, user PIN's, retry counter, CRL (certificate revocation list), media-individual private keys, media- individual public keys and random number seeds. But, the storage device 140 may have either four or more expansion areas or two or less ones only. Each of the license areas may store either 129 or more licenses or 127 or less ones only. Further, individual areas may store different numbers of licenses. In addition, even when the storage device 140 has a function to store a greater number of licenses, the certificate authority can impose a limit on the number of licenses or may permit the storage device to store a less number of licenses.

Referring to FIG. 3, the information terminal according to an embodiment of the present invention is constructed as shown therein.

The information terminal 120 includes an input unit controller 385 for controlling input/output operations, a liquid crystal display unit controller 315 for controlling display operations, a ROM 364, a memory card interface controller 325 for controlling connection to the storage device 140, a communication unit controller 395 for communication with the information distributor 100, an external connection interface controller 335, a RAM 362, a CPU 360 and an EEPROM 366. These components are coupled to each other through a bus 350 or a connection means comparable to the function of the bus. The communication unit controller 395 is connected to a communication unit 390 such as a radio LAN adapter or PHS modem adapter. The input unit controller 385 is connected to an input unit 380 such as a button, dial, keyboard, mouse, touch panel or tablet. The liquid crystal display unit controller 315 is connected to a liquid crystal display unit 310. The memory card interface controller 325 is connected to a memory card interface 320 such as an MMC interface. The external connection interface controller 335 is connected to an external connection interface 330 such as an RS 232 interface or USB interface. These components operate by receiving from a clock generator 370 a clock subjected to frequency division and/or phase inversion, if necessary. Also, these components operate by receiving from a secondary battery 345 electric power subjected to DC/AC conversion, frequency conversion, voltage conversion or current conversion, if necessary. Alternatively, the information terminal 120 may be constructed such that it does not carry the communication section (communication unit 390 and communication unit controller 395) and the external connection section (external connection interface 330 and external connection interface controller 335).

When storing or browsing arbitrary information by using a license, a user renders the storage device 140 usable by using a PIN 190. When the PIN verification is successful, the storage device 140 receives acknowledgement of a VERIFY_PIN command for execution of a designated function. The information terminal 120 or 160 issues the VERIFY_PIN command. Structurally, the VERIFY_PIN command may have at data an instruction and first and second parameters. In this case, the instruction consists of 2 bytes, of which head one byte represents the kind of application and succeeding one byte represents operations the application executes. In case the storage device 140 has a plurality of memory areas to which the VERIFY_PIN command is operated, the latter half of the instruction may be represented in terms of combinations of the memory areas and functions. The first parameter may be constructed of 32 bytes so as to be used to store PIN's for verification. Also, the second parameter may have a byte length determined by the instruction so as to be handled as a parameter transferred to a function executed by the instruction.

Referring now to FIG. 4, there is shown a list of instructions effective in the VERIFY_PIN command according to an embodiment of the invention. The storage device 140 may be mounted or packaged with part or the whole of applications shown in FIG. 4. If addition of applications arises, they may be added newly. In that case, the kind of applications is designated by the head byte of the instruction. The VERIFY_PIN command has four application types of user authentication application, random number generation application, certificate authority application and individual application. The user authentication application may have an area selection function (without PIN verification), a function to select an area and perform license operation protocol (download, read, move or retransmission), a function to update the PIN 190, a function to update a verification frequency limit value, a function to initialize the license area and set a new PIN and a function to initialize the retry counter. The random number generation application may have a function to generate random numbers. The certificate authority application may have a function to update the certificate authority public key, a function to update the certificate, a function to update individual encryption keys held in the storage device 140, a function to update information concerning the license area and a function to update the CRL. In the individual application, individual applications can be set in the storage device 140. As for instructions starting with Ch (12 in hexadecimal notation), it is not necessary to guarantee that even with the same instruction as that in another storage device 140, the same function will be executed. With the VERIFY_PIN command added with a new command, reading is permitted when a flag complying with the authentication scheme is set in the access control condition 114. Preferably, however, unless the authentication scheme corresponding to the flag set in the access control condition 114 exists, the license will be prevented from being read.

Referring to FIG. 5, the flow of function decision in the storage device according to an embodiment of the invention will be described. A command 1110 and data 1120 inputted to the storage device 140 from the information terminal 120 or 160 through the input/output interface are decided as to instructions by an instruction decider 1130 and individual instructions are transferred. Out of the command 1110, one corresponding to CMD24 is sent to a security instruction decider 1140 and it branches to individual security instructions on the basis of the command 1110. Out of the command 1110, one corresponding to the VERIFY_PIN is sent to an application decider 1150 based on the instruction. The application decider 1150 based on the instruction makes reference to an instruction part in data. A process when the head byte of the instruction is 00 h is transferred to the user authentication application, a process in the case of 10 h is transferred to the PIN generation application, a process in the case of 80 h is transferred to the certificate authority application and a process when the head 4 bits are Ch is transferred to the individual application. At that time, in case another value is designated and the storage device 140 has an application related to the instruction, the application may be executed. That is not the case, an error signal is returned. If a user application is selected, the processing is taken over to a function decider 1160 based on the instruction. The function decider based on the instruction carries out transfer to individual functions by using the least significant four bits. In the case of the value being 0 h, transfer to the license area selection function (without PIN verification) is performed; in the case of the value being 1 h, transfer to the license area selection function (with PIN verification) is performed; in the case of the value being 2 h, transfer to the PIN update function is performed; in the case of the value being 3 h, transfer to the verification frequency limit value update function is performed; in the case of the value being 4 h, transfer to the function to initialize the license area is performed; and in the case of the value being 5 h, transfer to reset the retry counter is performed. After the function distribution, a selector 1170 of license area uses upper four bits of lower byte of the instruction to apply execution of a process based on the function to a designated license area.

The license area selection function (without PIN verification) is a function to select a designated license area. But the certificate authority can invalidate this function under a condition of access to the license area. Selection of the license area signifies that an area subjected to an operation by a security process instruction excepting the succeeding VERIFY_PIN command is switched. In this function, neither the first parameter nor the second parameter needs to be set particularly. Details of license operation protocol started by this function will be described later.

The license area selection function (with PIN verification) is a function to verify a PIN by using a reference PIN related to a designated license area. But when the retry counter comes to a verification frequency limit value and the verification frequency limit value is not 0 (zero), an error signal may be returned. If this holds true, the retry counter may be returned to the initial value, a PIN verification pass flag may be set and a license area designated by the instruction may be selected. In case the certificate authority makes such a setting that the apparatus need not be authenticated particularly, a state ready for receiving an instruction for subsequent exchange of session key may be set up. That is not the case, an instruction for subsequently verifying the certificate may be needed. In the event that the verification fails, the retry counter may be incremented by one. But when the verification frequency limit value is 0, the retry counter need not be incremented. Further, if the retry counter reaches the verification frequency limit value in this phase and a function to prevent illegal or unauthorized use of the storage device 140 is set by the certificate authority, the initialization flag may be set to ON, user data in the storage device 140 may be erased and thereafter the initialization flag may be set to OFF. If the data in the storage device 140 is removed on the way of this process, the ON-state of the initialization flag is kept and in the phase of the subsequent use of the storage device 140, reading of this flag may be commenced so that the initialization work of the storage device 140 may be resumed in the case of the initialization flag being ON. In this function, a PIN for verification is set as the first parameter. No PIN may be set to the second parameter particularly. Details of license operation protocol started by this function will be described later.

The PIN update instruction is for a function to verify a PIN by using a reference PIN related to a designated license area and change the PIN when the verification is succeeds. But when the retry counter reaches the verification frequency limit value and the verification frequency limit value is not 0, an error signal may be returned. If that is the case, the retry counter may be returned to the initial value and the PIN may be changed using a value set in the second parameter. If the verification fails, the retry counter may be incremented by one. But in the case of the verification frequency limit value being 0, the retry counter need not be incremented. In this function, the PIN for verification is set in the first parameter and a new PIN is set in the second parameter.

The verification frequency limit value update instruction is for a function to verify a PIN by using a reference PIN related to a designated license area and change the verification frequency limit value when the verification is successful. But when the retry counter comes to the verification frequency limit value and the verification frequency limit value is not 0, an error signal may be returned. If that is the case, the retry counter may be returned to the initial value and the verification frequency limit value may be changed using a value set in the second parameter. But in case the certificate authority limits update of the verification frequency limit value, an error signal may be returned. If the verification fails, the retry counter may be incremented by one. But when the verification frequency limit value is 0, the retry counter need not be incremented. In this function, the PIN for verification is set in the first parameter and a new verification frequency limit value is set in the second parameter.

The license area initialization function is a function to invalidate all licenses related to a designated license area and perform setting of a new PIN. But when erase of license due to initialization need not be done under a condition of access to a license, there needs no erasing. By using data inputted after all the licenses have been erased, resetting of the PIN may be carried out and also resetting of a master PIN may be carried out to thereby return the retry counter to the initial value. But in case initialization of the master PIN in the license area initialization function is so set as to be invalid by the certificate authority, the initialization of the master PIN need not be done and an error signal may be returned. Also, if the license area initialization function is so set as to be invalid, no initialization of license area may be done and an error signal may be returned. In this function, the PIN for verification need not be set in the first parameter. A new PIN may be set in the second parameter.

The reset retry counter function is a function to verify a master PIN by using a reference master PIN related to a designated license area. When the verification is successful, the retry counter may be returned to the initial value and the master PIN may be updated using inputted data. In case the certificate authority instructs that the reference PIN is to be also updated, the reference PIN may be set to a specified value such as 0000. In this function, the PIN is set in the first parameter and a new master PIN is set in the second parameter.

If in these functions of user authentication application the license area is so set as to be invalid by the certificate authority, an error signal may be returned.

As to the random number generation application, one type may exist in which authentication information is included in data inputted externally and acts as a seed and the other type may exist in which that is not the case. As the authentication information included in the seed is an MAC address of apparatus, IP address, individual identifiers of users, individual identifiers of certificates or time. In case the authentication information is included in the data acting as the seed, the storage device 140 performs verification by using that information during license reading. It is assumed that the reference data for verification is stored in a license, a designated license area or a memory area related to the storage device 140 per se.

The random number generation function is a function to return the retry counter to the initial value when verification of a PIN is carried out using a reference PIN related to a designated license area and when the verification is successful, save data included in the second parameter in the memory and generate random numbers by using information in the storage device 140. But when the retry counter reaches the verification frequency limit value and the verification frequency limit value is not 0, an error signal may be returned. But in case the certificate authority limits the generation of random numbers, an error signal may be returned. In the event that the verification fails, the retry counter may be incremented by one. Protocol in the random number generation function will be described later.

The function of the certificate authority application will now be described. The certificate authority application has a certificate authority public key update function, a certificate update function, an area related information update function, an authentication information update function and a CRL update function.

The certificate authority public key update function is a function to verify a certificate authority PIN by using a reference certificate authority PIN related to a designated license area and when the verification is successful, change the certificate authority public key. In this case, a block, designated by input data, of a public key of a number designated by the input data may be updated using the input data. But a scheme may be set up in which data to be written at that time is encrypted with a dedicated common key and decrypted when it is stored in the storage device 140.

The certificate update function is a function to verify a certificate authority PIN by using a reference certificate authority PIN related to a designated license area and when the certificate authority PIN is legal, to update a certificate.

When the verification is successful, a block, designated by input data, of a certificate of a number designated by the input data may be updated using the input data. But a scheme may be set up in which the data to be written at that time is encrypted by a dedicated common key and is decrypted in the phase of storage in the storage device 140.

The area related information update function is a function to verify a certificate authority PIN by using a reference certificate authority PIN related to a designated license area and when the certificate authority PIN is legal, update area related information. When the verification is successful, the area related information may be updated using inputted data. Available as the area related information is an access condition for license area, certificate authority PIN, card public key or verification frequency limit value for prevention of illegal use of card. But a scheme may be set up in which the data to be written at that time is encrypted with a dedicated common key and decrypted in the phase of storage in the storage device 140.

The authentication information update function is a function to verify a certificate authority PIN by using a reference certificate authority PIN related to a designated license area and when the certificate authority PIN is legal, update authentication information. When the verification is successful, the authentication information may be updated using input data. Available as the authentication information is public keys differing depending on the kind of service or serial numbers of public keys differing depending on the individual memory devices 140, private keys, common keys or certificate authority public keys, these serial numbers differing for individual storage devices 140. But a scheme may be set up in which the data to be written at that time is encrypted with a dedicated common key and decrypted in the phase of storage in the storage device 140.

The CRL update function is a function to verify a certificate authority PIN by using a reference certificate authority PIN related to a designated license area and when the verification is successful, update the CRL. With the verification succeeding, the CRL may be updated using input data. But a scheme may be set up in which the data to be written at that time is encrypted with a dedicated common key and decrypted in the phase of storage in the storage device 140.

In the functions of the certificate authority application, an error signal may be returned in the event that the authentication application is so set as to be invalid.

In the information set by the certificate authority, the condition of access to the license area is information settable license area by license area and is used to select, from functions offered by the maker, a function meeting security requirements of storage device 140 issued by the certificate authority. Usable as the access condition for the license area is validity/invalidity of the initialization instruction, validity/invalidity of the master PIN, validity/invalidity of the illegal use prevention function, permissibility/impermissibility of write of the license after its issue by the storage device 140, permissibility/impermissibility of the selection of an area without PIN verification, validity/invalidity of the area per se, validity/invalidity of other applications than the user authentication application and certificate authority application or permissibility/impermissibility of utilization of the certificate authority application after its issue by the storage device 140. The illegal use prevention function referred to herein is a function to impose the verification frequency limit during the use of a lock function, set an illegal use flag in the memory area 460 when a limit value is reached and erase all data in the storage device 140. When this function is effective, the state of the illegal use flag during initialization of the storage device 140 is decided and if the initialization of the storage device 140 is unfinished while the illegal use being fulfilled, the initialization of the storage device 140 is resumed. In the phase of completion of the initialization, the storage device 140 releases the illegal use flag. Alternatively, data to be erased during operation may be selected by the certificate authority. To sort, the data is available taking the form of the whole or part of data stored in the secure area 440, the whole or part of data stored in the normal area 450, the whole or part of data stored in the key information area 460 or arbitrary combinations of data in the individual memory areas. In case the above sorting is settable, the maker of the storage device 140, the certificate authority, the user or all or any of them may proceed with the setting. Right to do the setting may be limited so that the maker of storage device 140, the certificate authority and the user may have the limited right to do the setting. In the case where the setting can be done individually as above, it is preferable that the maker of storage device 140 can do the setting during the fabrication or by means of an application for the maker, the certificate authority can do the setting by means of the certificate authority application and the user can do the setting through the user authentication function application.

By utilizing the VERIFY_PIN command, a high security function can be given to advantage. A higher security function can be implemented either by initially adding authentication based on the VERIFY_PIN command in all security processes requiring higher security, thus ensuring an advantage that the storage device 140 can afford to implement the security process for the benefit of only an individual or group knowing the PIN or by providing a plurality of license storage areas, thus ensuring an advantage that utilization can be made under conditions of different users, different security requirements, and increased number of storage licenses or different services.

Figure 6:
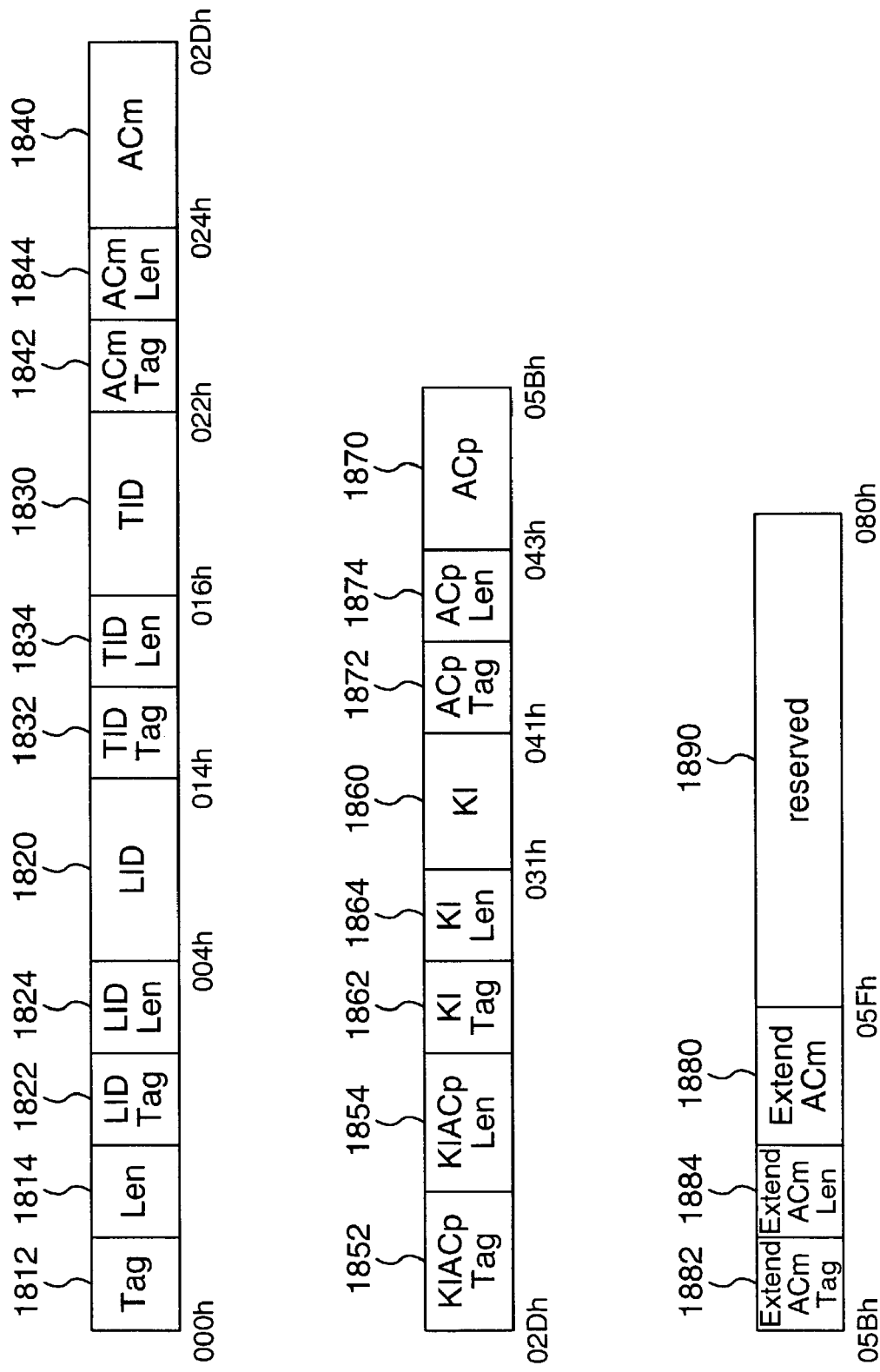
FIG. 6 is a diagram showing the data structure of a license according to an embodiment of the invention.

Referring to FIG. 6, there is illustrated the data structure of license.

Structurally, the license has in sequence tag (Tag) indicative of the kind of data, length (Len) indicative of a byte length of the data and actual data (Value) and the Value may structurally have a plurality of Tag's, Len's and Value's. Preferably, coding of the data structure follows the ASN 1 (Abstract Syntax Notation One). The license has, as the Value, LID 1820, TID 1830, ACm 1840, Kl 1860, ACp 1870, ExtendACm 1880 and Reserved 1890. The LID 1820 is short for license identification and is an identifier allotted to licenses individually. The TID 1830 is short for transaction identification and is an identifier allotted to download processes of license individually. The ACm 1840 indicates an access limit when a read unit reads a stored license and is a access control condition corresponding to the access control condition 140 in FIG. 1. The Kl 1860 is license data and corresponds to the license 110 in FIG. 1. The ACp 1870 is an access limit in the read unit and corresponds to the access control condition 120 in FIG. 1. The ExtendACm is an identifier when the read unit reads a license during use of the VERIFY_PIN command.

As processes started by the VERIFY_PIN command, there may be prepared a process concerning license storage from the information distributor 100 and information terminal 120 to the storage device 140 (license download protocol), a process concerning read of licenses from the storage device 140 (license read protocol), a process concerning move of licenses from the storage device 140 to another storage device (license move protocol), and a process for its resumption when the process is interrupted during storage of a license into the storage device 140 (license retransmission protocol). Preferably, these protocols are related to a plurality of instructions for data transmission and instructions for data reception to and from the storage device 140 and by executing the individual instructions in a specified order, storage and read of data to and from the storage device 140 and security operation can be permitted. In case the instructions are issued in an order other than the above specified order, the storage device 140 may initialize data concerning the order or sequence of execution of accumulated instructions and may return an error signal. Also, among instructions, ones may be prepared for which the execution order is not specifically determined or one may be prepared which heads the processing procedure, these instructions having such specifications that they are executed to cause the storage device 140 to initialize the accumulated data concerning the execution order and to return an error signal. In addition, even instructions included in protocol for license operation may be utilized without following the processing procedure under different procedures and security requirements.

The individual protocols will now be described.

Figure 7:
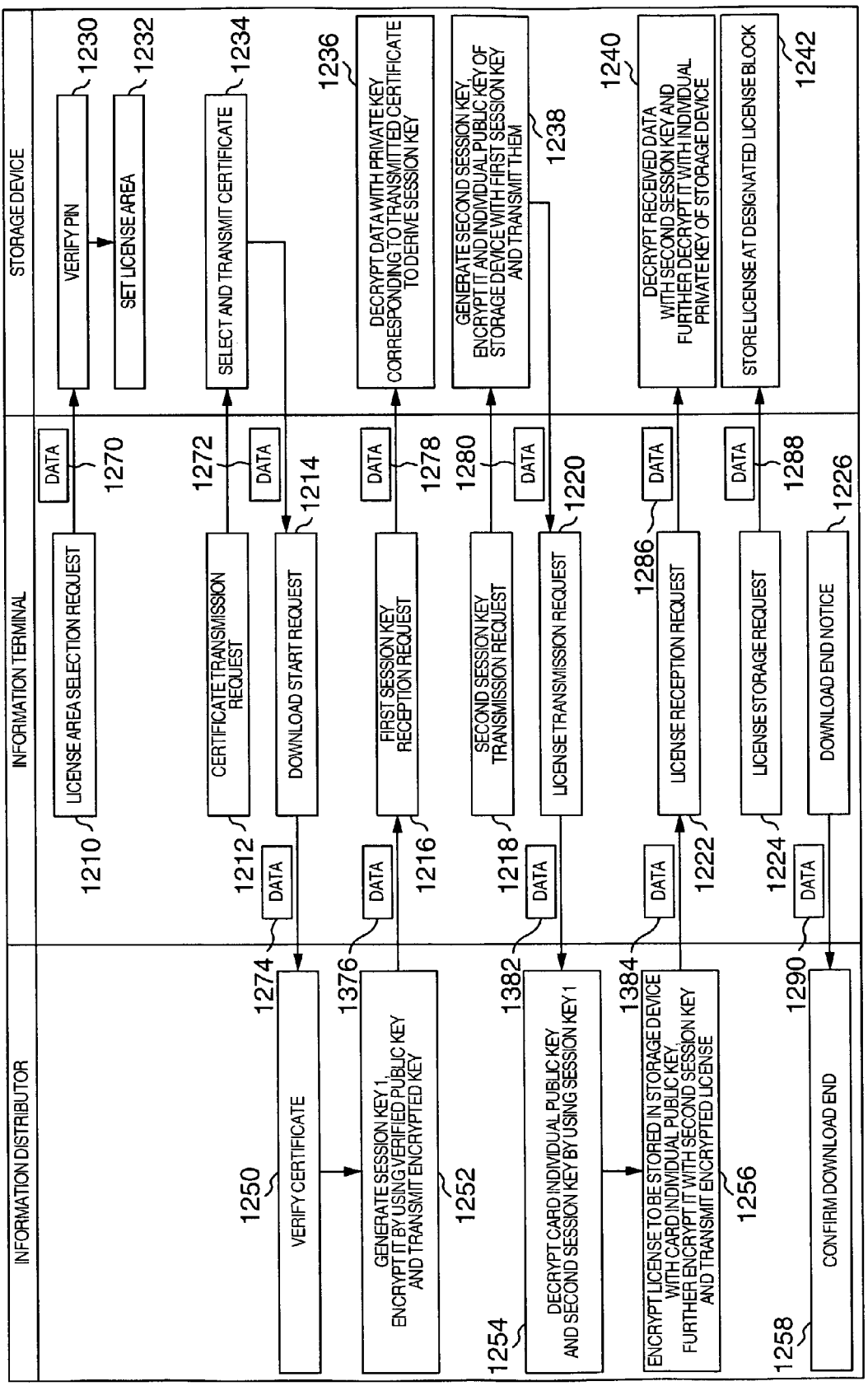
FIG. 7 is a flowchart showing a download process of the license according to an embodiment of the invention.

Referring to FIG. 7, there is illustrated a flowchart for explaining the license download protocol. When starting download of a license, the information terminal 120 transmits data 1270 to the storage device 140 (1210). The data 1270 is data including a license area number to be processed and a PIN 190. The storage device 140 verifies the PIN 190 on the basis of information stored in the storage device 140 (1230). At that time, for the benefit of the verification, the user preferably performs in advance setting of the PIN 190 by using the PIN update function, setting of a verification frequency limit value by using the verification frequency limit value update function and setting of a master PIN 190 by using the reset retry counter function. If the verification succeeds, the storage device 140 sets the designated license area and makes itself ready for reception of the next instruction (1232). With the PIN verification successful, the information terminal 120 requests the storage device 140 to transmit a certificate (1212). In case the certificate authority approves selection of the license area in the absence of the PIN 190, the information terminal 120 may transmit the data 1270 removed of the PIN 190. In such a case, the storage device 140 selects the license area without performing PIN 190 verification and holds information to the effect that the license area is selected without performing PIN verification. The storage device 140 selects the certificate and transmits it to the information terminal 120 (1234). The information terminal 120 transmits received data 1272 to the information distributor 100 after adding supplementary information to the data, if necessary (1214). The information distributor 100 derives the certificate from received data 1274 and verifies it on the basis of stored information (1250). When succeeding in the verification, the information distributor 100 generates a first session key and transmits the first session key after encrypting it by using a verified public key (1252). The information terminal 120 transmits received data 1276 to the storage device 140 after making supplement/erase of information to/from the data, if necessary (1216). The storage device 140 derives the encrypted data from received data 1278 and decrypts it by using a private key corresponding to the public key of the transmitted certificate to thereby derive a session key (1236). When confirming that the preceding instruction is successful, the information terminal 120 requests the storage device 140 to transmit a second session key (1218). The storage device 140 generates the second session key and transmits the second session key and an individual public key of the storage device 140 after encrypting them with the first session key (1238). When receiving data 1280 from the storage device 140, the information terminal 120 transmits it to the information distributor 100 after making supplement/erase of information to/from the data, if necessary (1220). The information distributor 100 decrypts received data 1282 by using the first session key to obtain the individual public key of storage device 140 and the second session key (1254). If this process is well done, the information distributor 100 encrypts the license to be stored in the storage device 140 with the individual public key of storage device 140, further encrypts the encrypted license with the second session key and transmits it eventually (1256). The information terminal 120 transmits received data 1284 to the storage device 140 after making supplement/erase of information to/from the data, if necessary (1222). The storage device 140 decrypts received data 1286 with the second session key and further decrypts it with the individual private key of storage device 140 (1240). After confirming that this process is successful, the information terminal 120 transmits data 1288 to the storage device 140 (1224). The data 1288 is described with a block number for storage of the license. The storage device 140 stores the license at a designated license block (1242). After confirming that the process is successful, the information terminal 120 transmits to the information distributor 100 a message to the effect that download is completed, together with data concerning transaction (1226). The information distributor 100 receives data 1290 and ends the download procedure (1258).

Figure 8:
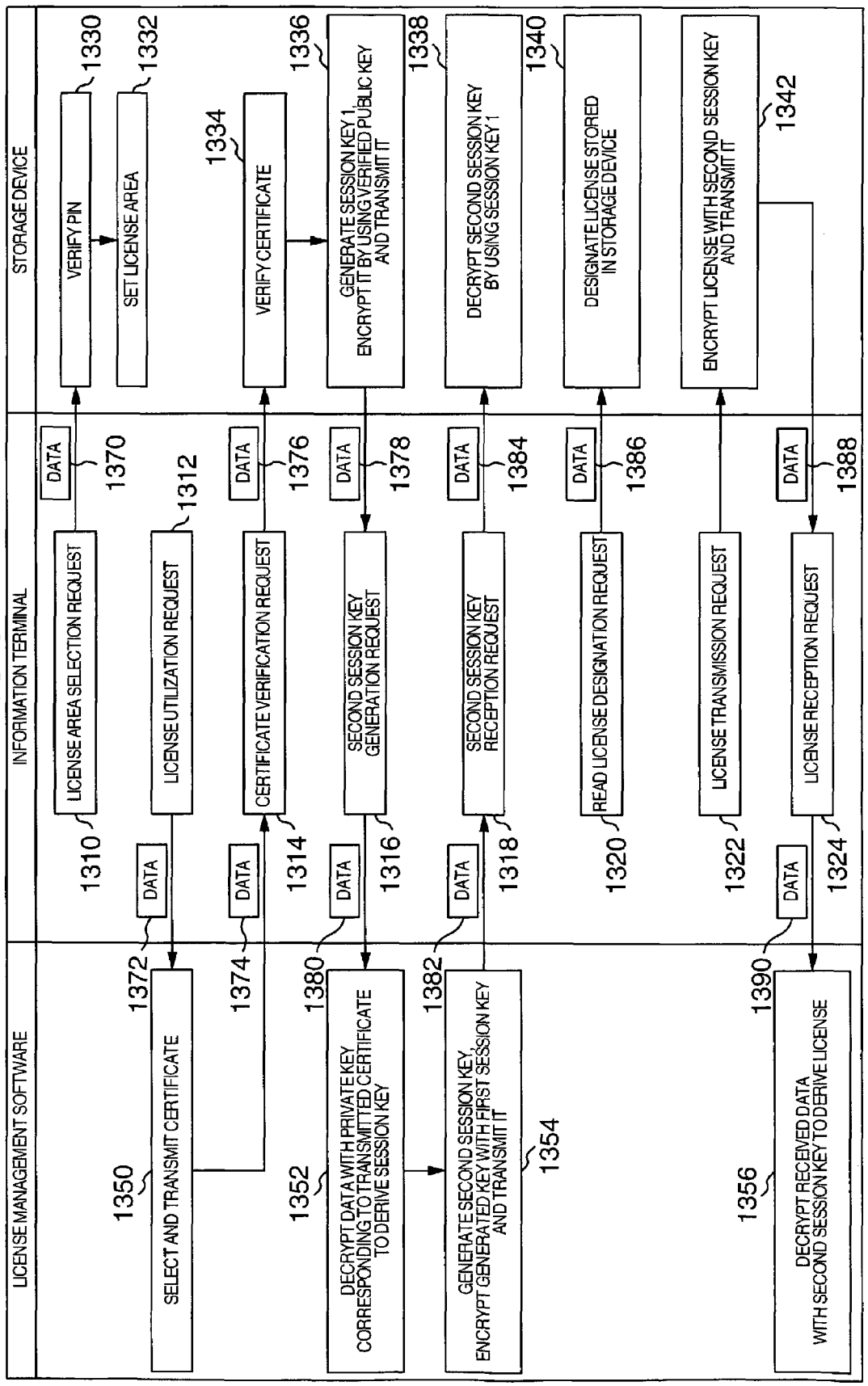
FIG. 8 is a flowchart showing a read process of the license according to an embodiment of the invention.

Referring to FIG. 8, there is illustrated a flowchart for explaining the license read protocol according to an embodiment of the invention.

When starting read of a license, the information terminal 160 transmits data 1370 to the storage device 140 (1310). The data 1370 is data including a license area number to be processed and a PIN 190. The storage device 140 verifies the PIN 190 on the basis of information stored in the storage device 140 (1330). Preferably, for the benefit of the verification, the user performs in advance setting of the PIN by using the PIN update function, setting of a verification frequency limit value by using the verification frequency update function and setting of a master PIN by using the reset retry counter function. If the verification is successful, the storage device 140 sets the designated license area and makes itself ready for reception of the next instruction (1332). With the PIN 190 verification successful, the information terminal 160 transmits to license management software a request for utilization of the license (1312). In case the certificate authority 210 approves selection of the license area in the absence of the PIN 190, the information terminal 160 may transmit the data 1370 removed of the PIN 190. In such a case, the storage device 140 selects the license area without performing PIN 190 verification and holds information to the effect that the license area is selected without performing PIN verification. When receiving data 1372 including designation of a certificate, the license management software selects the certificate and transmits it to the information terminal 160 (1350). The information terminal 160 transmits received data 1374 to the storage device 140 after making supplement/erase of information to/from the data, if necessary (1314). The storage device 140 derives the certificate from received data 1376 and verifies it on the basis of information stored in the storage device 140 (1334). When succeeding in the verification, the storage device 140 generates a first session key and transmits the first session key after encrypting it with a verified public key (1336). The information terminal 160 transmits received data 1378 to the license management software after making supplement/erase of information to/from the data, if necessary (1316). The license management software derives the encrypted data from received data 1380 and decrypts that data by using a private key corresponding to the public key of the transmitted certificate to thereby derive a session key (1352). If there is no need of verifying security requirements of the license particularly by means of the certificate, processing from step 1350 to step 1336 may be omitted. In this case, in the step 1332, the storage device 140 may generate the first session key and transmit the generated key after encrypting it by using a public key of the license management software stored in advance in the storage device 140. Next, the license management software generates a second session key and transmits the key after encrypting it with the first session key (1354). When receiving data 1382, the information terminal 160 makes supplement/erase of information to/from the data, if necessary and then requests the storage device 140 to receive the second session key (1318). When receiving data 1384, the storage device 140 decrypts it by using the first session key to obtain the second session key (1338). When this process is done well, the information terminal 160 designates to the storage device 140 the license number to be read (1320). The storage device 140 reads the license from the license area on the basis of the number designated by data 1386 (1340). If the certificate authority approves the use of a access control condition 140, the storage device 140 may use the access control condition to impose a limit on license read. When this process is successful, the information terminal 160 requests the storage device 140 to transmit the license (1322). The storage device 140 encrypts the license with the second session key and then transmits it (1342). The information terminal 160 transmits received data 1388 to the license management software after making supplement/erase of information to/from the data, if necessary (1324). The license management software decrypts received data 1390 with the second session key to derive the license data (1356).

Figure 9:
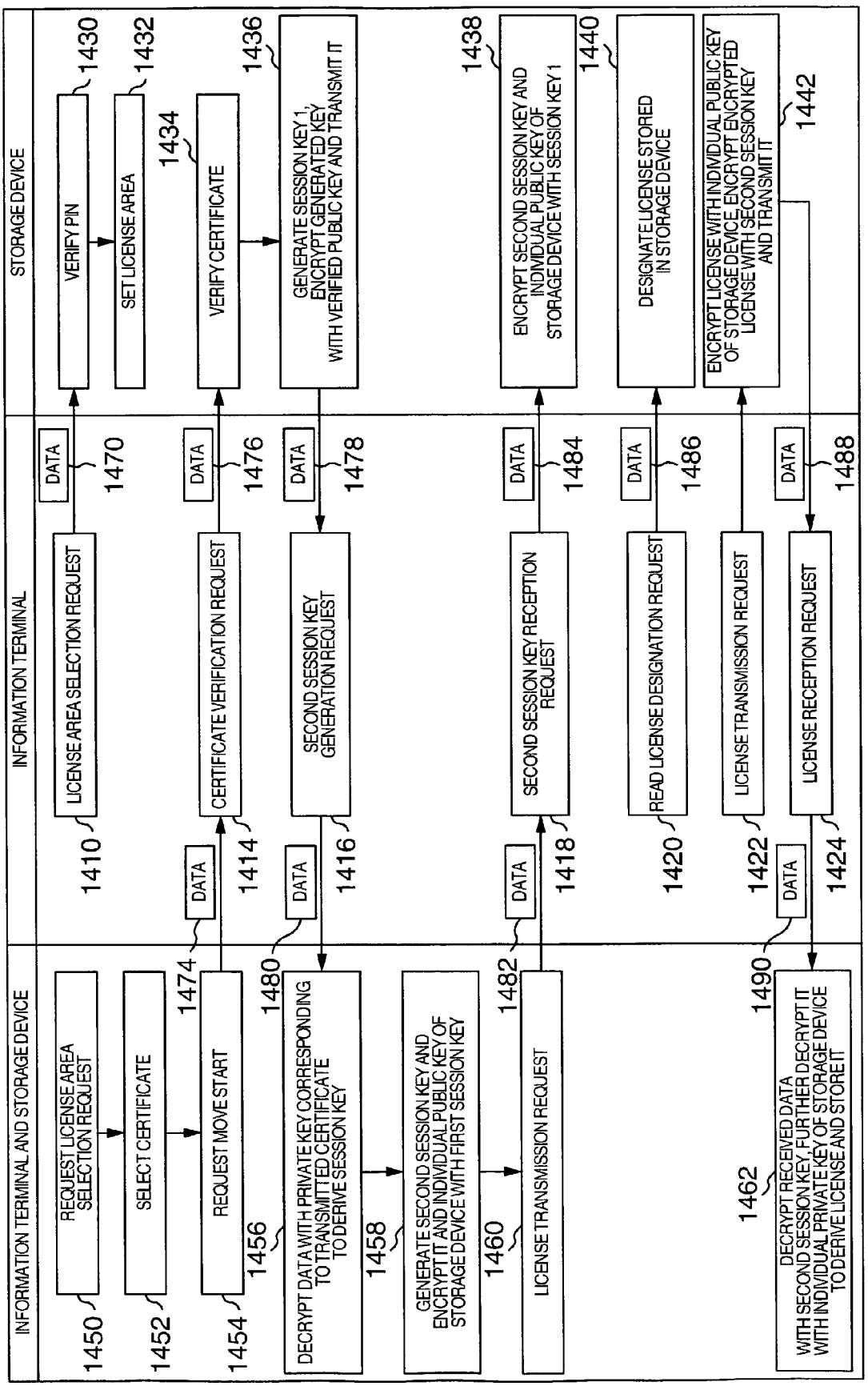
FIG. 9 is a flowchart showing a move process of the license according to an embodiment of the invention.

Referring to FIG. 9, there is illustrated a flowchart for explaining the license move protocol. When starting move of a license, the information terminal transmits data 1470 to the storage device 140 (1410). The data 1470 is data including a license area number to be processed and a PIN 190. The storage device 140 verifies the PIN 190 on the basis of information stored in the storage device 140 (1430). Preferably, at that time, for the benefit of the verification, the user performs in advance setting of the PIN by using the PIN update function, setting of a verification frequency limit number by using the verification frequency limit value update function and setting of a master PIN by using the reset retry counter function. If the verification is successful, the storage device 140 sets the designated license area and makes itself ready for reception of the next instruction (1432). With the PIN 190 verification successful, the information terminal waits for a move start request from another information terminal. In case the certificate authority approves selection of the license area in the absence of the PIN 190, the information terminal may transmit the data 1470 removed of the PIN 190. At that time, the storage device 140 may select the license area without performing PIN 190 verification and in such a case, the storage device 140 holds information to the effect that the license area is selected without performing PIN verification. The different information terminal is in an environment in which it is connected to another storage device. It is assumed that the ensuing operations of the different information terminal and the different storage device are controlled in accordance with the same license download protocol as that for the information terminal and storage device 140 in FIG. 7.

Figure 10:
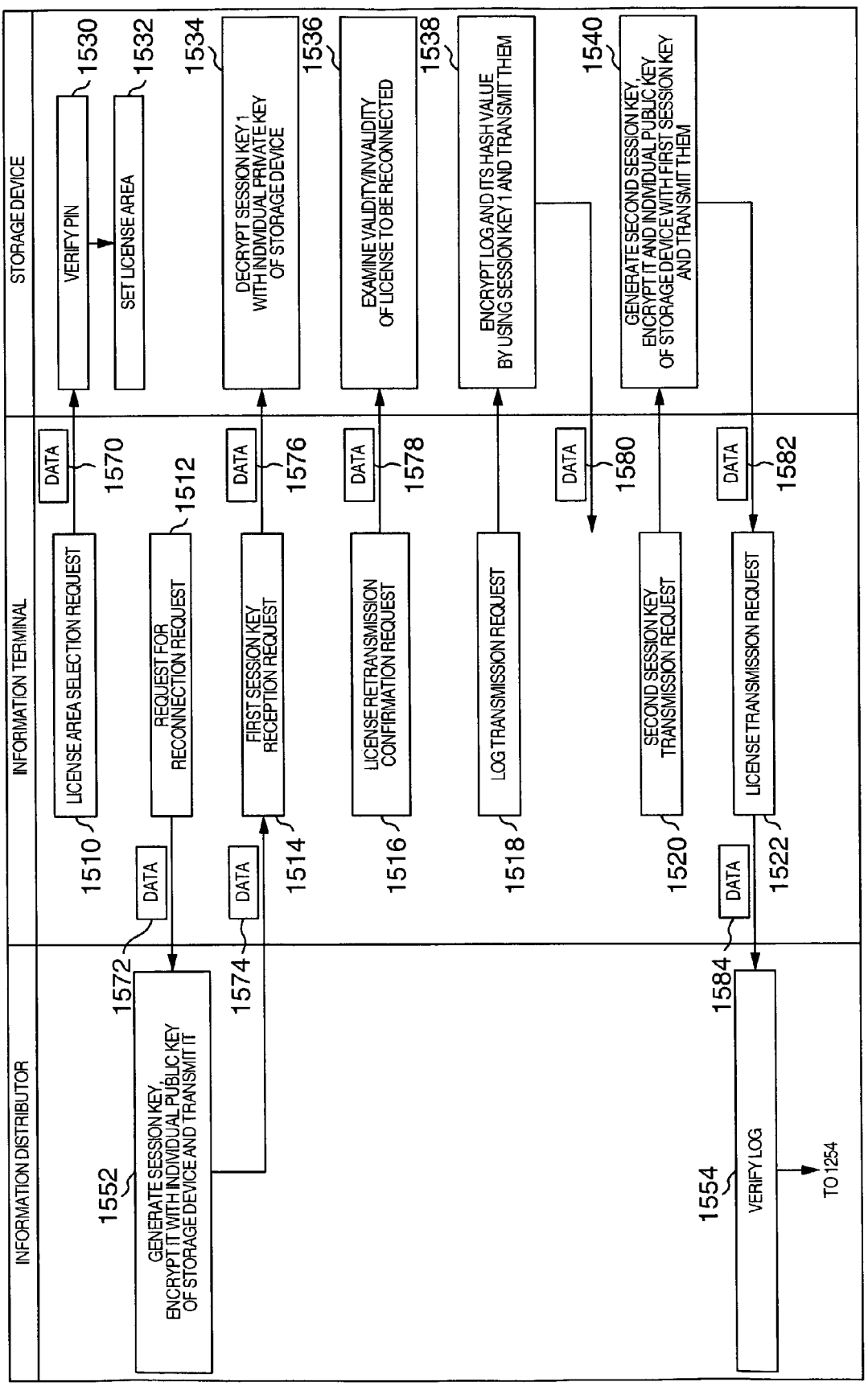
FIG. 10 is a flowchart showing a reconnection process of the license according to an embodiment of the invention.

Referring to FIG. 10, there is illustrated a flowchart for explaining the license retransmission protocol. When starting retransmission of a license, the information terminal 120 transmits data 1570 to the storage device 140 (1510). The data 1570 is data including a license area number to be processed and a PIN 190. The storage device 140 verifies the PIN 190 on the basis of information stored in the storage device 140 (1530). Preferably, at that time, for the benefit of the verification, the user performs in advance setting of the PIN 190 by using the PIN update function, setting of a verification frequency limit value by using the verification frequency limit value update function and setting of a master PIN by using the reset retry counter function. If the verification is successful, the storage device 140 sets the designated license area and makes itself ready for reception of the next instruction (1532). With the PIN 190 verification successful, the information terminal 120 makes a request to the information distributor 100 for reconnection (1512). For the purpose of performing reconnection, the information terminal 100 transmits data 1572 to the information distributor 100. Receiving the data 1572, the information distributor 100 generates a first session key, browses an individual public key of storage device 140 of the other party of communication by using an identifier derived out of the data 1572 and adapted to specify a session, encrypts the first session key by using the public key and transmits the encrypted first session key (1552). When receiving data 1574 from the information distributor 100, the information terminal 120 requests the storage device 140 to receive the first session key after making supplement/erase of information to/from the data, if necessary (1514). By using an individual private key of storage device 140, the storage device 140 decrypts the encrypted data included in data 1576 transmitted from the information terminal 120 to derive the first session key (1534). When this instruction is successful, the information terminal 120 transmits a license retransmission confirmation request to the storage device 140 (1516). The storage device 140 examines validity/invalidity of the license to be reconnected using, from data 1578 transmitted from the information terminal 120, the identifier for specifying the session and if the license is in valid condition indicating that the license has already been stored, the process is interrupted. If the license is invalid indicating that the license has not been stored yet, steps as below follow (1536). More particularly, the information terminal 120 subsequently requests the storage device 140 to transmit a log (1518). The storage device 140 encrypts the log and its hash value by using the first session key and transmits them to the information terminal 120 (1538). Receiving data 1580 from the storage device 140, the information terminal 120 holds it in a memory and in turn, transmits a second session key transmission request to the storage device 140 (1520). The storage device 140 encrypts, with the first session key, the second session key and an individual public key of storage device 140 and transmits them to the information terminal 120 (1540). When receiving data 1582, the information terminal 120 adds the data 1580 to it and after making supplement/erase of information to/from the data, if necessary, transmits a license transmission request to the information distributor 100 (1522). Receiving data 1584 from the information terminal 120, the information distributor 100 verifies the data 1580. If the data is determined to be legal, the steps following the step 1254 in FIG. 7 are proceeded with (1554).

Next, protocol during utilization of the random number generation application will be described. The random number generation application is an application for generating random numbers by utilizing seed data inputted externally and a license stored in a license area and sending them to a host. As the seed data, time is used herein. The random number generation application consists of two protocols of license download protocol and random number generation protocol. The license download protocol is the same as the protocol described previously in connection with FIG. 7 and the random number generation protocol differs simply in operation in the storage device 140, so that interface for these protocols are made to be identical.

Figure 11:
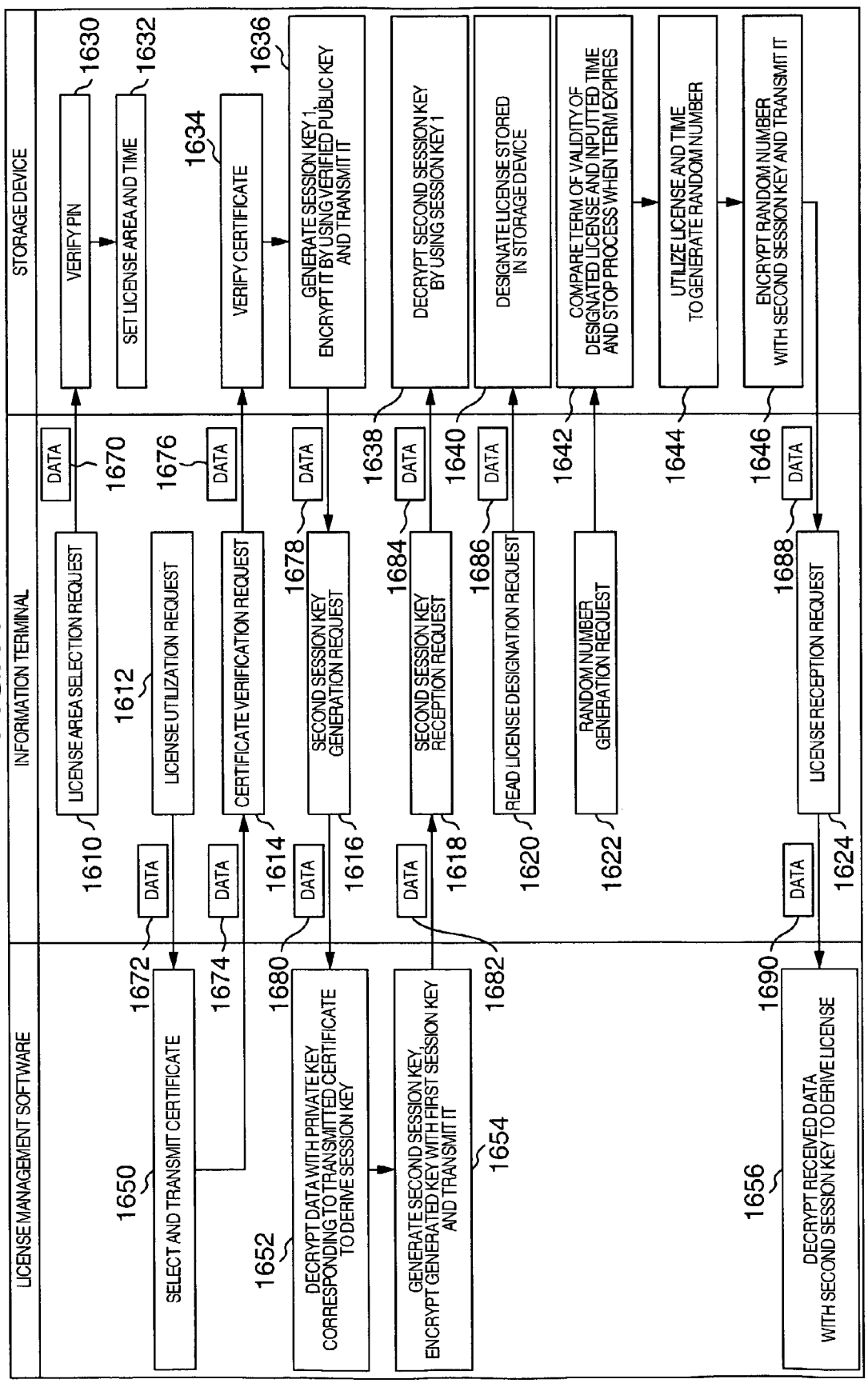
FIG. 11 is a flowchart showing a read process of random numbers according to an embodiment of the invention.

Referring to FIG. 11, there is illustrated a flowchart for explaining the random number generation protocol. When starting read of a license, the information terminal 120 transmits data 1670 to the storage device 140 (1610). The data 1670 is data including a license area number to be processed, a PIN 190 and time. The storage device 140 verifies the PIN on the basis of information stored in the storage device 140 (1630). Preferably, at that time, for the benefit of the verification, the user performs in advance setting of the PIN 190 by using the PIN update function, setting of a verification frequency limit value by using the verification frequency limit value update function and setting of a master PIN by using the reset retry counter function. When the verification is successful, the storage device 140 sets the designated license area, holds inputted time in a memory and makes itself ready for reception of the next instruction (1632). With the PIN verification successful, the information terminal 120 transmits a request for utilization of the license to the license management software (1612). In case the certificate authority approves selection of the license area and utilization of the application in the absence of the PIN 190, the information terminal 120 may transmit the data 1670 removed of the PIN 190. In such a case, the storage device 140 selects the license area without performing PIN 190 verification and holds information to the effect that the license area is selected without performing PIN verification. Receiving data 1672 including designation of a certificate, the license management software selects the certificate and transmits it to the information terminal 120 (1650). The information terminal 120 transmits received data 1674 to the storage device 140 after making supplement/erase of information to/from the data, if necessary (1614). The storage device 140 derives the certificate from received data 1676 and verifies it on the basis of the information stored in the storage device 140 (1634). When succeeding in the verification, the storage device 140 generates a first session key and after encrypting the key by using a verified public key, transmits it (1636). The information terminal 120 transmits received data 1678 to the license management software after making supplement/erase of information to/from the data, if necessary (1616). The license management software derives the encrypted data from received data 1680 and decrypts it by using a private key corresponding to the public key of the transmitted certificate to derive a session key (1652). Next, the license management software generates a second session key and after encrypting the key with the first session key, transmits it (1654). Receiving data 1682, the information terminal 120 makes supplement/erase of information to/from the data, if necessary and thereafter requests the storage device 140 to receive the second session key (1618). Receiving data 1684, the storage device 140 decrypts it by using the first session key to obtain a second session key (1638). In case this process is done well, the information terminal 120 designates to the storage device 140 the license number to be read (1620). The storage device 140 reads the license out of the license area on the basis of the number designated by data 1686 (1640). If the certificate authority 210 approves the use of the access control condition 140, the storage device 140 may impose a limit on move of the license by using the access control condition. When this process is successful, the information terminal 120 requests the storage device 140 to generate a random number (1622). The storage device 140 compares a term of validity attendant on the read-out license with the held time and when the term comes to the time, returns an error signal (1642). If the time is not reached, the storage device 140 generates the random number from the time and license data (1644). The storage device 140 encrypts the obtained random number with the second session key and then transmits it (1646). The information terminal 120 transmits received data 1688 to the license management software after making supplement/erase of information to/from the data, if necessary (1624). The license management software decrypts received data 1690 with the second session key to derive the random number. The license management software may utilize the thus obtained random number as a means for preparing an encryption key and a PIN.

Next, applications settable individually will be described. Available as the individually settable applications are an encryption process application, a biometrics authentication application and the like.

The application for encrypting process is an application in which a license held in the storage device 140 is utilized to encrypt or decrypt data received externally of the storage device 140 or data in the secure area 440. This application may be packaged as part of the random number generation application. Functions included in the encryption application are an encryption process function, a decryption process function and a license download function. Preferably, a license utilized by the application for encryption process has, as an access condition in the storage device 140, a flag concerning permissibility/impermissibility of encryption process and permissibility/impermissibility of decryption process. Preferably, in accordance with security requirements, limits may be imposed on read and move of these licenses license by license or the license may have the limitation by itself. When utilizing this application, whether the encryption process function or the decryption process function is utilized under the VERIFY_PIN command is designated by an instruction and besides, a PIN is set in the first parameter, data desired to be encrypted or decrypted is set in the second parameter and then they are transmitted to the storage device 140. When verification of the PIN is successful, the storage device 140 holds the data desired to be encrypted or decrypted and set in the second parameter in a memory and sets an object license area. Ensuing operations are the same as those in the random number generation application and follow the steps in FIG. 11. But a process as below may be carried out in place of the steps 1642 and 1644. More particularly, the storage device 140 consults permissibility/impermissibility of encryption/decryption of the designated data on the basis of the access control condition 112 attendant on the license or the license area related information and decides whether the requested process is executable. If the process is determined to be executable, the data inputted together with VERIFY_PIN is encrypted or decrypted using the license.

The biometrics authentication application is an application in which instead of the normal PIN authentication, identifiers indicative of features extracted from biometrics information are utilized to make authentication. Available as the biometrics information are signature, iris of eyeball, voice spectrum, fingerprint and the like.

These individual applications may be assigned to numbers other than CXh (X means any of 0 h to Fh).

In case a means for authentication is employed in which when the certificate authority requests a license operation based on mutual authentication, mutual authentication with the other party of communication may be carried out during the license operation.

Figure 12:
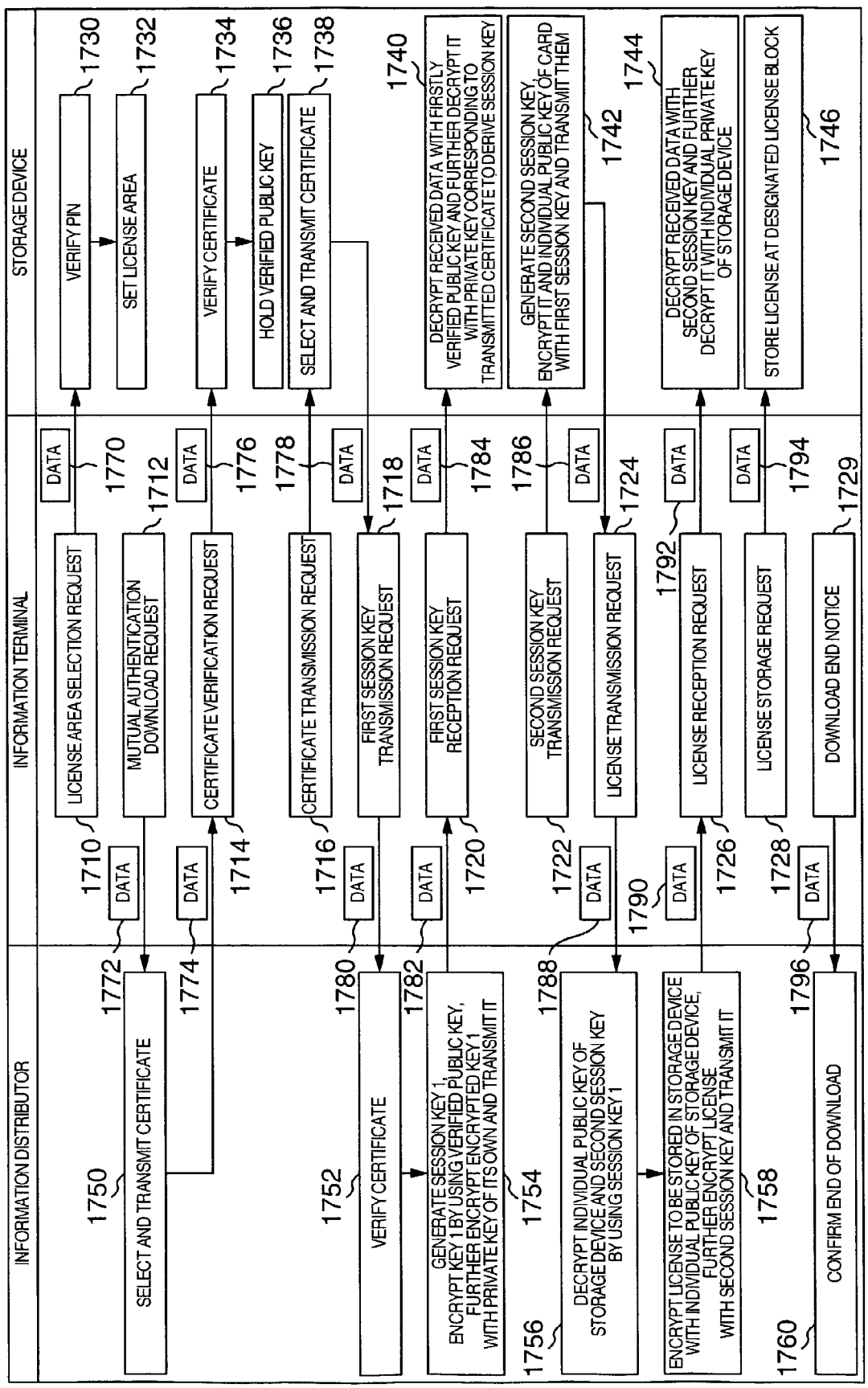
FIG. 12 is a flowchart showing a download process of a mutual authentication license according to an embodiment of the invention.

In the case where the storage device 140 authenticates the information distributor 100 for authentication of the license server during download, this process will follow steps in FIG. 12.

A flowchart shown in FIG. 12 is to explain mutual authentication license download protocol. When starting mutual authentication download of a license, the information terminal 120 transmits data 1770 to the storage device 140 (1710). The data 1770 is data including a license area number to be processed and a PIN. The storage device 140 verifies the PIN on the basis of information stored in the storage device 140 (1730). Preferably, at that time, for the benefit of the verification, the user performs in advance setting of the PIN 190 by using the PIN update function, setting of a verification frequency limit value by using the verification frequency limit value update function and setting of a master PIN by using the verification frequency limit value update function. When succeeding in the PIN 190 verification, the storage device 140 sets the designated license area and makes itself ready for reception of the next instruction (1732). With the PIN 190 verification successful, the information terminal 120 transmits a mutual authentication download request to the information distributor 100 (1712). In case the certificate authority 210 approves selection of the license area in the absence of the PIN 190, the information terminal 120 may transmit the data 1770 removed of PIN 190. In such a case, the storage device 140 selects the license area without performing the PIN 190 verification and holds information to the effect that the license area is selected without performing PIN verification. Receiving data 1772 including designation of a certificate, the information distributor 100 selects the certificate and transmits it to the information terminal 120 (1750). The information terminal 120 transmits received data 1774 to the storage device 140 after making supplement/erase of information to/from the data, if necessary (1714)The storage device 140 derives the certificate out of received data 1776 and verifies it on the basis of the information stored in the storage device 140 (1734). When succeeding in the verification, the storage device 140 holds a verified key (1736). With the verification successful, the information terminal 120 transmits a certificate transmission request to the storage device 140 (1716). The storage device 140 selects the certificate and transmits it to the information terminal 120 (1738). The information terminal 120 transmits received data 1778 to the information distributor 100 after adding supplemental information to the data, if necessary (1718). The information distributor 100 derives the certificate from received data 1780 and verifies it on the basis of stored information (1752). When succeeding in the verification, the information distributor 100 generates a first session key, encrypts it by using a verified public key, further encrypts the encrypted key by using a private key of its own and transmits a resulting key (1754). The information terminal 120 transmits received data 1782 to the storage device 140 after making supplement/erase of information to/from the data, if necessary (1720). The storage device 140 derives the encrypted data from received data 1784, decrypts the data with the public key of the verified certificate and further decrypts the decrypted data by using a private key corresponding to the public key of the received certificate to derive a session key (1740). When confirming that the previous instruction is successful, the information terminal 120 requests the storage device 140 to transmit a second session key (1722). The storage device 140 generates the second session key, encrypts the individual public key of the storage device 140 with the first session key and transmits the encrypted key (1742). Receiving data 1786 from the storage device 140, the information terminal 120 transmits it to the information distributor 100 after making supplement/erase of information to/from the data, if necessary (1724). The information distributor 100 decrypts received data 1788 by using the first session key to obtain the individual public key of storage device 140 and the second session key (1756). When this process succeeds, the information distributor 100 encrypts the license to be stored in the storage device 140 with the individual public of storage device 140 (storage-device 140-individual public key) and further encrypts the encrypted license with second session key, thereby transmitting the ultimate license (1758). The information terminal 120 transmits received data 1790 to the storage device 140 after making supplement/erase of information to/from the data, if necessary (1726). The storage device 140 decrypts received data 1792 with the second session key and further decrypts it with a private key of storage device 140 (1744). After confirming that this process succeeds, the information terminal 120 transmits data 1794 to the storage device 140 (1728). It is assumed that the data 1794 is described with a block number for storage of the license. The storage device 140 stores the license in the block designated by the data 1794 (1746). After confirming that the process is successful, the information terminal 120 transmits to the information distributor 100 a message to the effect that the download is finished, along with data concerning the transaction (1729). Receiving data 1796, the information distributor 100 ends the download procedure (1760).

In the case where the certificate authority requests the mutual authentication during license download, it is desirable that the storage device 140 does not permit any download of license according to other method than the mutual authentication to be applied to the same license area. The mutual authentication may also be utilized for read or move of a license.

According to the embodiments of the invention, in apparatus in which data is permitted to be read only when either or both of the user and the apparatus are legal or authorized by using the PIN in lieu of the certificate of public key, it is possible to attain advantages that addition of authentication scheme can be permitted and that a program having a part common to data used by a plurality of users, a plurality of services, a plurality of certificate authorities or a plurality of apparatus can be used to carry out access control conforming to security requirements of the data.

According to the invention, information that can be read by means of the certificate and information that can be read by means of information determined by the user are stored to attain an advantage that user utilizable applications can be expanded.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage device capable of verifying a right to access thereto by an information processing unit based on a certificate from said information processing unit, and which sends data to said information processing unit in accordance with a result of the verification, comprising:

a secure area that is accessible upon success of the verification;

a normal area that is accessible without verification;

a management area for storing information associated with said secure area; and a processor which controls access to said secure area, said normal area and said management area;

said secure area including a basic area from which a first stored data is readable upon success of verification of the certificate from said information processing unit, and an expansion area from which a second stored data is readable upon success of verification of an input personal identifying number (PIN) by reference to a user PIN in said management area, said processor verifying the certificate from said information processing unit, reading said first stored data from said basic area upon success of said verification therefor, and outputting said first stored data to said information processing unit; and said processor verifying said input PIN using the user PIN in the management area, reading said second stored data from the expansion area upon success of said verification therefor, and outputting said second stored data to said information processing unit, wherein said processor receives an instruction issued by said information processing unit or an instruction issued by an intermediator for intermediation between said information processing unit and said storage device, interprets the contents of said instruction and decides whether a predetermined VERIFY_PIN command is included or not, when said interpretation result shows that said instruction includes said VERIFY_PIN command, said processor decides whether an application designated by said VERIFY_PIN command is a user application, and when the decision result shows that said application is said user application, said processor decides a function of said application as to whether the function of said user application is a function necessary for user PIN authentication or a function needing user PIN authentication, then, said processor decides within which said secure area is the area designated by said command; and then, said processor performs a processing according to the application designated by the VERIFY_PIN command to the decided area within said secure area or an area within said management area corresponding to said decided area within said secure area.

2. A storage device according to claim 1, wherein said processor outputs a certificate of a memory in said management area to an information distributor when storing data downloaded from the information-distributor, and said information distributor outputs said downloaded data to said memory upon success of verification of said memory using said certificate.

3. A storage device according to claim 1, wherein said processor decides whether an application designated by said VERIFY_PIN command is a user application, an application of a certificate authority issuing the certificate, an application for generating a user PIN necessary for user authentication, or another application.

4. A storage device according to claim 3, wherein said instruction includes a command and data, said processor comprises:

a first decision unit which interprets contents of said instruction;

a second decision unit responsive to a decision by said first decision unit that said command is a predetermined security command, for deciding said security command;

a third decision unit responsive to a decision by said second decision unit that said security command is said VERIFY_PIN command, for referring to an instruction section within said VERIFY_PIN command to decide whether said application is said user application, said certificate authority application, said user PIN generating application or said other application;

a fourth decision unit which decides an application function;

a fifth decision unit which refers to the instruction section within said VERIFY_PIN command to decide within which said secure area is the area designated by said command; and an execution unit which performs a processing according to a function of said application to the area within said secure area decided by said fifth decision unit or an area within said management area corresponding to the decided area within said secure area.

5. A storage device according to claim 3, wherein the function of an application of said certificate authority includes a function which needs authentication by a different certificate authority than said certificate authority by issuing said certificate, and a function needing authentication based on an authority PIN includes a function of updating said certificate.

6. A storage device according to claim 5, wherein when said function of an application of the certificate authority is a function which needs authentication based on said authority PIN, said VERIFY_PIN command includes an authority PIN inputted by the authority.

7. A storage device according to claim 1, wherein said processor decides the application designated by said VERIFY_PIN command by interpreting, in a data string of said instruction at least one of, data which ranges over a predetermined length from the head and data which ranges over a predetermined length from the least significant bit.

8. A storage device according to claim 1, wherein said processor shares a part of the contents of process between reception of instruction and outputting of the first stored data within said basic area and a part of the contents of process between reception of said instruction and outputting of the second stored data within said expansion area.

9. A storage device according to claim 8, wherein said shared contents of process includes the contents of process for establishing a session between either said information processing unit or said intermediator having issued said instruction and said storage device.

10. A storage device according to claim 1, wherein when information associated with said basic area among the information of said management area is updated, verification of an input PIN is required using a PIN of the certificate authority which has issued said certificate within said management area; and when information associated with said expansion area among the information of said management area is updated, verification of an input PIN is required using a user PIN.

11. A storage device according to claim 10, wherein said processor updates the information associated with said basic area among the information of said management area, upon success of verification of an input PIN using a PIN of the certificate authority which has issued said certificate within said management area; and updates the information associated with said expansion area among the information of said management area, based upon success of verification of an input PIN using a user PIN.

12. A storage device according to claim 1, wherein the information associated with said basic area among the information of said management area includes said certificate and a key, and the information associated with said expansion area among the information of said management area includes said user PIN.

13. A storage device according to claim 1, wherein said user PIN is a user password or user biological information.

14. A storage device according to claim 1, wherein said storage device is a memory card.

15. A storage device according to claim 1, wherein said storage device is connected directly to an information terminal, and said information terminal is connected to said information processing unit or said information distributor through a network.

16. A storage device according to claim 1, wherein the function of needing authentication based on a user PIN is a function of selecting an area,
the function of not needing authentication based on a user PIN is a function of selecting an area, and
said function for user application includes a function of updating the user PIN.

17. A storage device according to claim 16, wherein said function of not needing authentication based on a user PIN and selecting an area is a function of switching an objective area based on a security command other than said VERIFY_PIN command.

18. A storage device according to claim 1, wherein when said function of user application is a function which needs authentication based on said user PIN, said VERIFY_PIN command includes a user PIN inputted by the user.

19. An information processing unit connectable to a storage device, comprising:
a memory which stores a certificate issued by a certificate authority;
an input unit which receives a request from a user; and
a processor which transmits said certificate to said storage device when receiving a request for reading a first stored data from said user, and which requests said user to input identification information when receiving a request for reading a second stored data from said user to transmit said identification information inputted from said user to said storage device,
said storage device comprising:
a secure area that is accessible based upon success of verification;
a normal area that is accessible without verification;
a management area for storing information associated with said secure area; and
a processor which controls access to said secure area, said normal area and said management area;
said secure area including a basic area from which said first stored data is readable upon success of verification of the certificate from said information processing unit, and an expansion area from which said second stored data is readable upon success of verification of an input personal identifying number (PIN) by reference to a user PIN in said management area,
said processor verifying the certificate from said information processing unit, reading said first stored data from said basic area upon success of said verification therefor, and outputting said first stored data to said information processing unit;
said processor verifying said input PIN using the user PIN in the management area, reading said second stored data from the expansion area upon success of said verification therefor, and outputting said second stored data to said information processing unit;
wherein said processor receives an instruction issued by said information processing unit or an instruction issued by an intermediator for intermediation between said information processing unit and said storage device, interprets the contents of said instruction and decides whether a predetermined VERIFY_PIN command is included not;
when said interpretation result shows that said instruction includes said VERIFY_PIN command, said processor decides whether an application designated by said VERIFY_PIN command is a user application,
when said application is decided to be said user application, said processor decides through determination of a function of said application whether the function of said user application is a function needing user PIN authentication or not;
then, said processor decides within which said secure area is the area designated by said command; and
then, said processor performs a processing according to the application designated by the VERIFY_PIN command, to the decided area within said secure area or an area within said management area corresponding to the decided area within said secure area;
said first data being the first stored data in said basic area; and
said second data being the second stored data in said expansion area.

* * * * *